(12) United States Patent
Lee et al.

(10) Patent No.: US 12,164,928 B2
(45) Date of Patent: Dec. 10, 2024

(54) SYSTEM BOOTING METHOD AND RELATED COMPUTER SYSTEM

(71) Applicant: Wiwynn Corporation, New Taipei (TW)

(72) Inventors: Yun-Hsuan Lee, New Taipei (TW); Yu-Shu Kao, New Taipei (TW); Chi-Chun Yuan, New Taipei (TW); Huai-Li Huang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 17/583,221

(22) Filed: Jan. 25, 2022

(65) Prior Publication Data

US 2023/0161598 A1    May 25, 2023

(30) Foreign Application Priority Data

Nov. 25, 2021   (TW) .................................. 110143886

(51) Int. Cl.
*G06F 9/4401* (2018.01)
(52) U.S. Cl.
CPC ............ *G06F 9/4405* (2013.01); *G06F 9/441* (2013.01); *G06F 9/4416* (2013.01)
(58) Field of Classification Search
CPC ....... G06F 9/4405; G06F 9/441; G06F 9/4416
See application file for complete search history.

(56) References Cited

U.S. PATENT DOCUMENTS

| | | | | |
|---|---|---|---|---|
| 2006/0010450 A1* | 1/2006 | Culter | .................. | G06F 9/5077 |
| | | | | 718/104 |
| 2009/0158299 A1* | 6/2009 | Carter | .................... | G06F 9/505 |
| | | | | 718/100 |
| 2012/0030457 A1* | 2/2012 | Zimmer | ................ | G06F 9/4401 |
| | | | | 713/2 |
| 2013/0254578 A1* | 9/2013 | Huang | .................... | G06F 1/266 |
| | | | | 713/330 |
| 2020/0319892 A1* | 10/2020 | Quinn | ................. | G06F 9/45558 |
| 2023/0119437 A1* | 4/2023 | Faasse | .................... | G06F 1/324 |
| | | | | 713/300 |

FOREIGN PATENT DOCUMENTS

| | | | | |
|---|---|---|---|---|
| CN | 102236398 A | 11/2011 | | |
| CN | 102368167 A | 3/2012 | | |
| CN | 103514043 A | 1/2014 | | |
| CN | 103608792 B | 3/2016 | | |
| CN | 110134456 A | 8/2019 | | |
| CN | 112463342 A | 3/2021 | | |
| JP | 2019046148 A | * 3/2019 | .......... | G06F 11/0757 |
| TW | 201020927 A1 | 6/2010 | | |
| WO | WO-2013008326 A1 | * 1/2013 | .......... | G06F 11/3664 |

* cited by examiner

*Primary Examiner* — Hyun Soo Kim
(74) *Attorney, Agent, or Firm* — Winston Hsu

(57) ABSTRACT

A system booting method for a computer system having a plurality of central processing units and a booting unit is disclosed. The system booting method includes determining, by the booting unit, a booting mode of the computer system; transmitting a booting signal, which is related to the booting mode, to the plurality of CPUs of the computer system; and entering a multi-CPU booting mode or entering an independent booting mode of the plurality CPUs according to the booting signal.

12 Claims, 5 Drawing Sheets

SYSTEM BOOTING METHOD AND RELATED COMPUTER SYSTEM

BACKGROUND OF THE INVENTION

1. Field of the Invention

The present invention relates to a system booting method and a related computer system, and more particularly, to a system booting method and a related computer system capable of achieving high-speed computation and diversifying system risks.

2. Description of the Prior Art

With trends of high-efficiency computation, cloud and Artificial Intelligence (AI), demands for computation ability of computer systems and servers are increased. The conventional computer system or server increases a core amount of a central processing unit (CPU) to improve the computation ability and data storage.

However, since the data computation is centralized on one computer system or server, a great amount of data would be damaged when some CPUs of the computer system are malfunctioned. Therefore, how to diversify the system risks with the improvement of the computation ability of the computer system or server is an important issue in the field.

SUMMARY OF THE INVENTION

In light of this, the present invention provides a system booting method and a related computer system to diversify risks of the computer system with high-speed computation.

An embodiment of the present invention discloses a system booting method for a computer system having a plurality of central processing units (CPU) and a booting unit, the system booting method comprises determining, by the booting unit, a booting mode of the computer system; transmitting a booting signal, which is related to the booting mode, to the plurality of CPUs of the computer system; and entering a multi-CPU booting mode or entering an independent booting mode of the plurality CPUs according to the booting signal.

Another embodiment of the present invention discloses a computer system, comprises a plurality of central processing units (CPU); and a booting unit, configured to determine a booting mode of the computer system, transmit a booting signal, which is related to the booting mode, to the plurality of CPUs of the computer system; and enter a multi-CPU booting mode or enter an independent booting mode of the plurality CPUs according to the booting signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
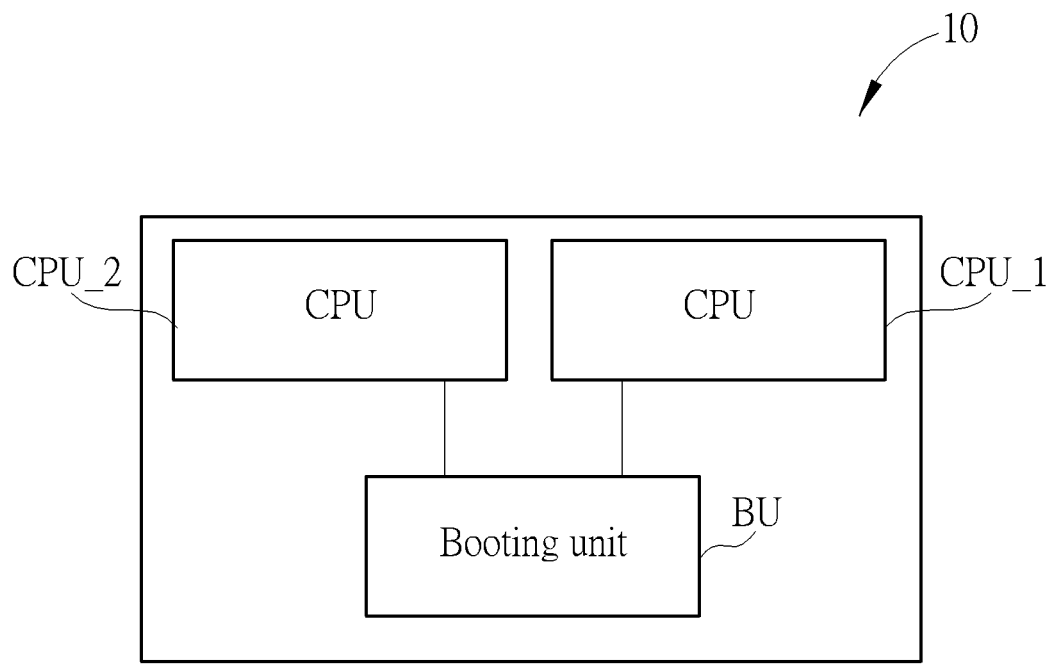
FIG. 1 is a schematic diagram of a computer system according to an embodiment of the present invention.

Please refer to FIG. 1, which is a schematic diagram of a computer system 10 according to an embodiment of the present invention. The computer system 10 includes a plurality of central processing units (CPU) CPU_1, CPU_2 and a booting unit BU. The computer system 10 may be a server or a computer system with multiple processors. The CPUs CPU_1, CPU_2 may be a single core processor or a multi-core processor, e.g. a single core processor, a quad-core processor or a processor with 64 cores. The booting unit BU is utilized for determining a booting mode of the computer system 10 and transmitting a booting signal, which is related to the booting mode, to the CPUs CPU_1, CPU_2 of the computer system 10, such that the CPUs CPU_1, CPU_2 may enter a multi-CPU booting mode or an independent booting mode according to the booting signal. For example, the booting unit BU may be a baseboard manager controller (BMC) or a module with booting function for managing a power source of the computer system 10. In this way, the computer system 10 according to an embodiment of the present invention may switch to different booting modes, such that the CPUs CPU_1, CPU_2 may enter identical operating system (OS) to achieve a high-speed computation or the CPUs CPU_1, CPU_2 may independently enter different operating systems to diversify system risks.

Notably, an amount of the above CPU is not limited thereto; the computer system with other amounts of CPU is applicable to the present invention. That is, in another embodiment, the amount of CPU may be three or more, and not limited to two CPUs.

Figure 2:
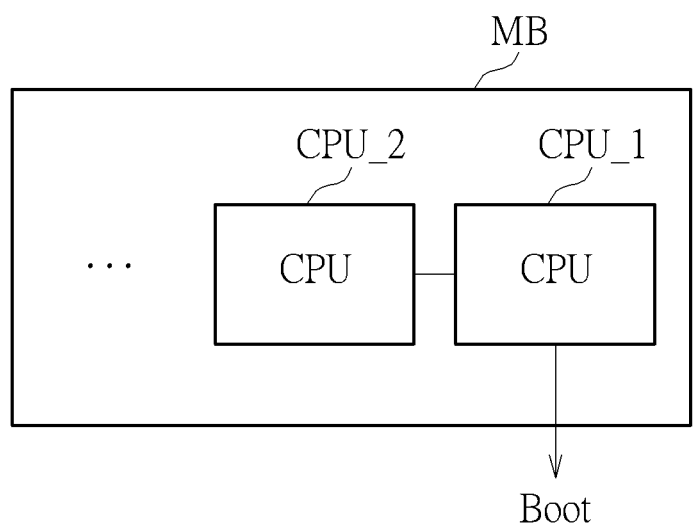
FIGS. 2 and 3 are schematic diagrams of a booting mode according to an embodiment of the present invention.
Figure 3:
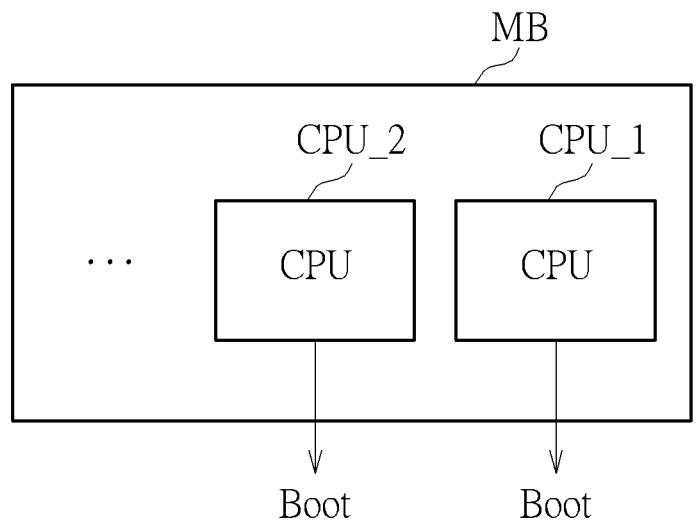

In detail, please refer to FIGS. 2 and 3, which are schematic diagrams of the booting mode according to an embodiment of the present invention. FIGS. 2 and 3 illustrate a motherboard MB having multiple CPUs CPU_1, CPU_2 . . . , wherein FIG. 2 illustrates that the CPUs CPU_1, CPU_2 . . . are connected and enter the identical operating system for processing identical thread or program under the multi-CPU booting mode.

In other words, under the multi-CPU booting mode, the CPUs CPU_1, CPU_2 . . . of the computer system 10 work together to achieve the high-speed computation. FIG. 3 illustrates that the CPUs CPU_1, CPU_2 . . . independently enter different operating systems for processing different threads or programs to diversify the system risks under the independent booting mode.

Referring to the method of the computer system 10 determining the booting mode, in an embodiment, the booting unit BU is configured to determine the booting mode according to a hardware status or a firmware status of the computer system 10, e.g. a variation of pin connection or the booting mode is modified by a user on firmware of the computer system 10. As such, when the computer system 10 is rebooted, the booting unit BU may communicate with the CPUs CPU_1, CPU_2 via a communication interface, such as an enhanced Serial Peripheral Interface Bus (eSPI) or a quad Serial Peripheral Interface Bus (QSPI).

Figure 4:
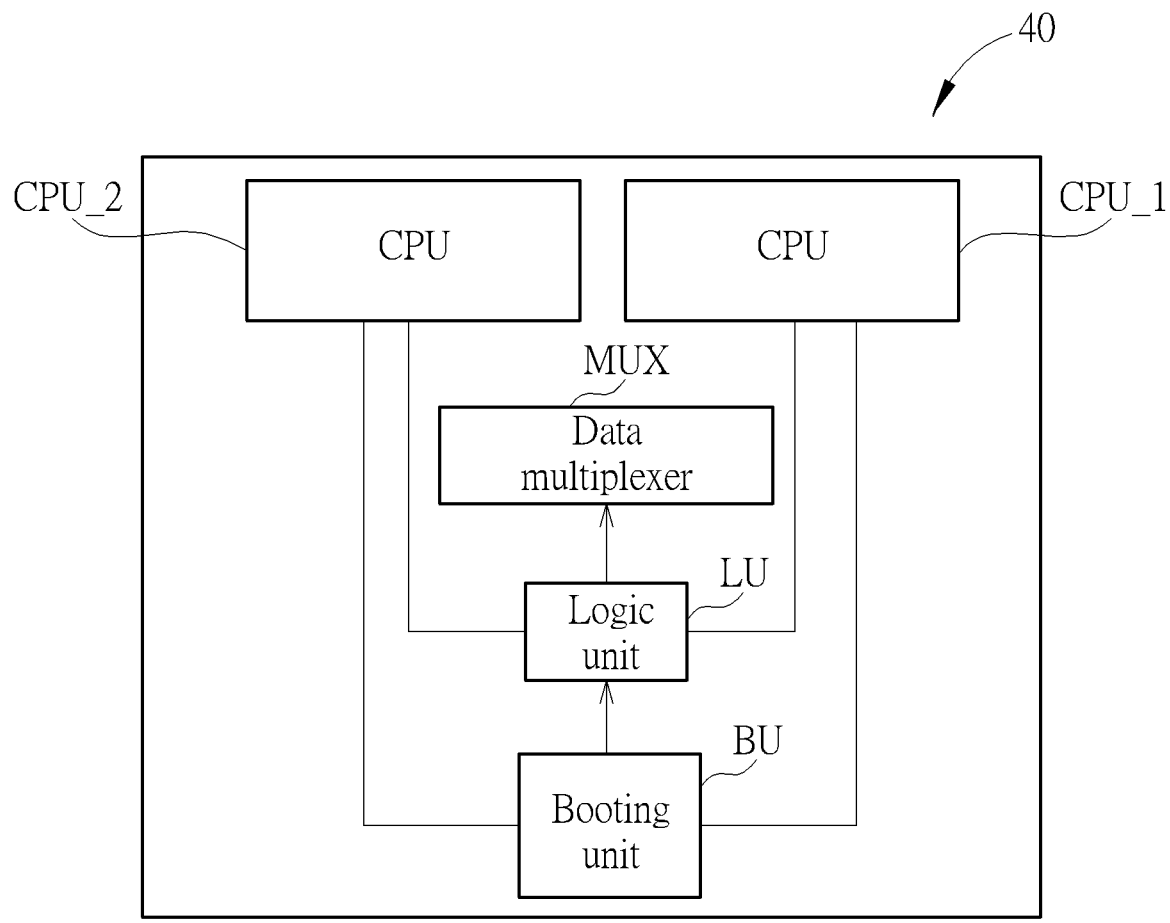
FIGS. 4 and 5 are schematic diagrams of the computer system according to an embodiment of the present invention.

In an embodiment, please refer to FIG. 4, which is a schematic diagram of a computer system 40 according to an embodiment of the present invention. Different from the computer system 10, the computer system 40 may further include a logic unit LU and a data multiplexer MUX, wherein the logic unit LU may be a complex programmable logic device (CPLD) or a field programmable gate array (FPGA). As shown in FIG. 4, when the CPUs CPU_1, CPU_2 enter the multi-CPU booting mode, the booting unit BU determines that the CPU CPU_1 as a main CPU, the booting unit BU communicates with the logic unit LU via an Inter-Integrated Circuit ($I^2C$), and then the logic unit LU transmits the booting signal to the CPUs CPU_1, CPU_2. In addition, the logic unit LU may modify signal status of the CPUs CPU_1, CPU_2 according to the booting signal, and then outputs General-purpose input/output (GPIO) signals to the data multiplexer MUX or other related elements on the motherboard MB, such that other elements on the motherboard MB may operate normally.

Notably, in another embodiment, the booting unit BU may directly transmit the booting signal to the CPUs CPU_1, CPU_2 to determine the CPU CPU_1 as the main CPU according to the booting mode, without transmitting the booting signal to the CPUs CPU_1, CPU_2 via the logic unit LU.

Moreover, when the CPUs CPU_1, CPU_2 of the computer system 40 in FIG. 4 are in the independent booting mode, the booting unit BU may determine each of the CPUs CPU_1, CPU_2 as the main CPU, and transmit corresponding booting signal to the CPUs CPU_1, CPU_2 via the logic unit LU.

Figure 5:
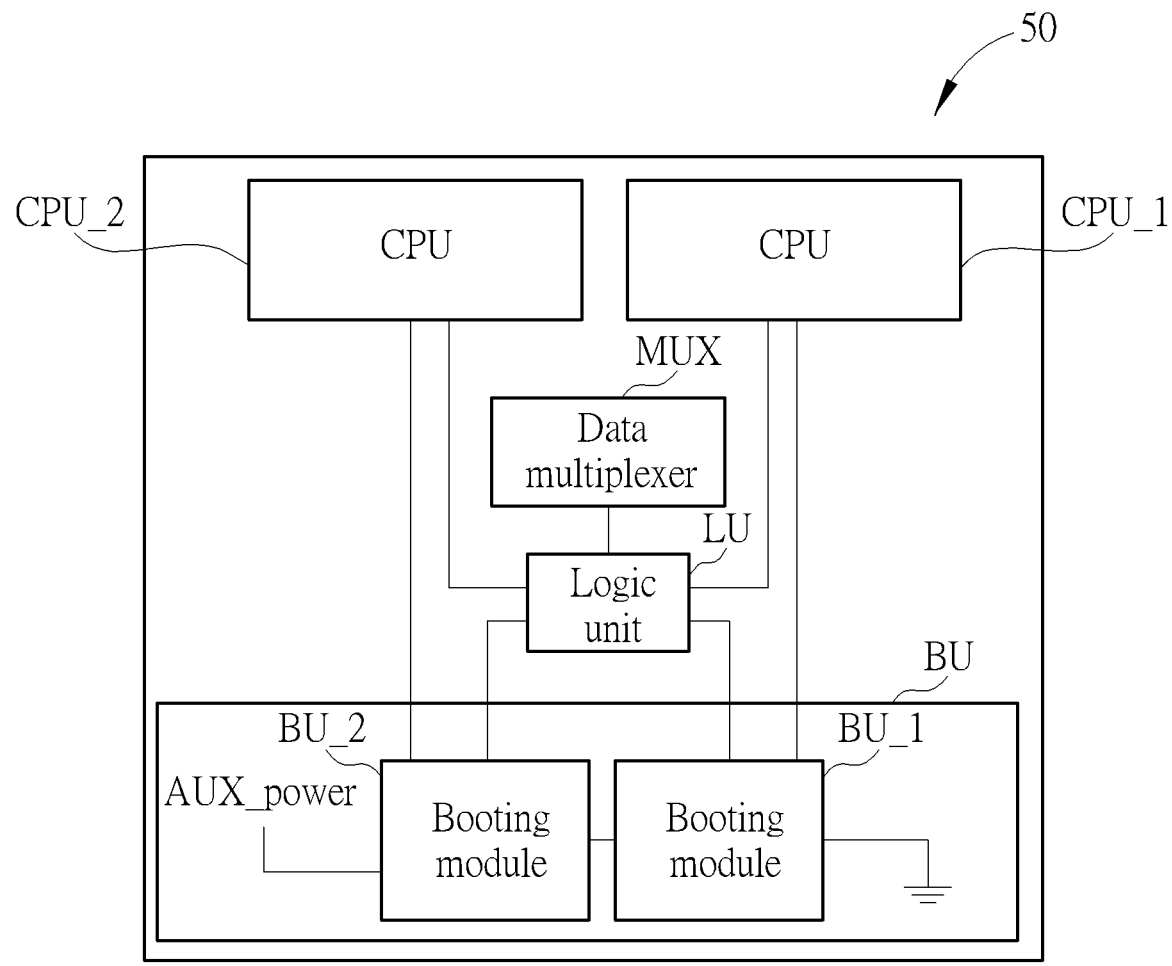

Please refer to FIG. 5, which is a schematic diagram of a computer system 50 according to an embodiment of the present invention. Different from the computer system 40, the booting unit BU of FIG. 5 includes a plurality of booting modules, i.e. the booting modules BU_1, BU_2. As shown in FIG. 5, when the booting unit BU includes the booting modules BU_1, BU_2, the booting module BU_1 of the booting unit BU is utilized for managing the power source of the computer system 10, and the booting module BU_1 determines a first amount of the booting module via Inter-Integrated Circuit ($I^2C$) and determines assignments of other booting modules of the booting unit BU. The booting unit BU may determine the first amount of the booting modules of the booting unit BU via firmware, a variation of voltage level of the motherboard MB or detection of hardware, e.g. a pin connection. For example, the booting unit BU determines existence of the booting modules BU_1, BU_2 (i.e. the first amount is two) via the $I^2C$, and then a main booting module is determined by each of the booting modules BU_1, BU_2 reading a signal level for managing the power source of the booting modules. In an example, when the signal read by the booting module BU_1 is low, the booting module BU_1 is the main booting module; when the signal read by the booting module BU_1 is high, the booting module BU_1 is not the main booting module.

Notably, the booting module BU_1 for managing the power source of the computer system 10 (i.e. the main booting module) may be default, or set by the user via firmware. That is, when the booting module BU_1 is broken, the booting module BU_2 may be assigned to manage the power source by default conditions of the computer system 10 or by the user.

In FIG. 5, the booting module BU_1 may determine corresponding booting mode (i.e. the multi-CPU booting mode or the independent booting mode) according to the firmware status or the hardware status of the computer system 50, and the logic unit LU may transmit the booting signal to the CPUs CPU_1, CPU_2. Further, the logic unit LU may modify the signal status of the CPUs CPU_1, CPU_2 based on the booting signal, and output the GPIO signals to the data multiplexer MUX or related elements on the motherboard MB, such that other elements on the motherboard MB may operate normally.

Figure 6:
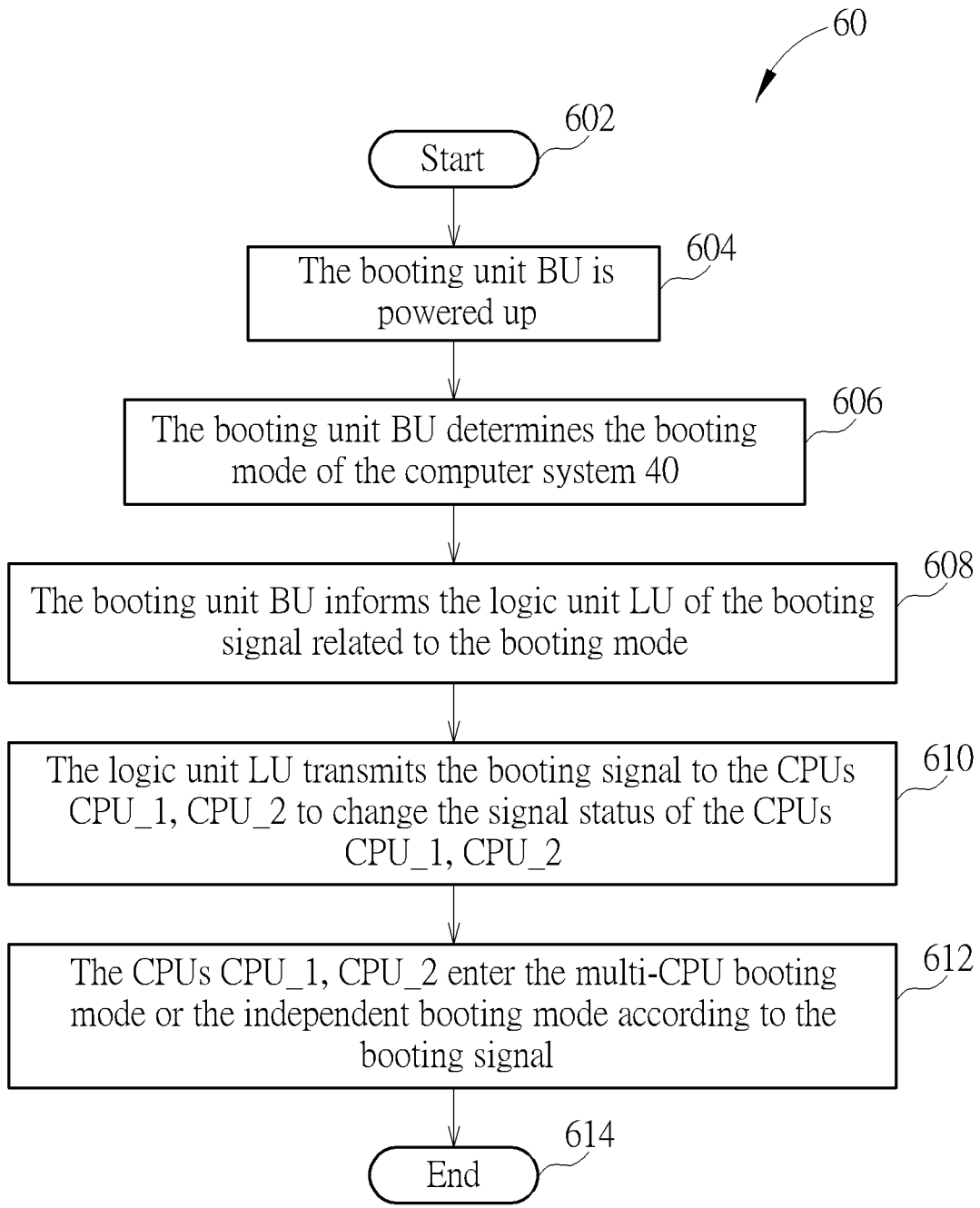
FIGS. 6 and 7 are schematic diagrams of a system booting method according to an embodiment of the present invention.
Figure 7:
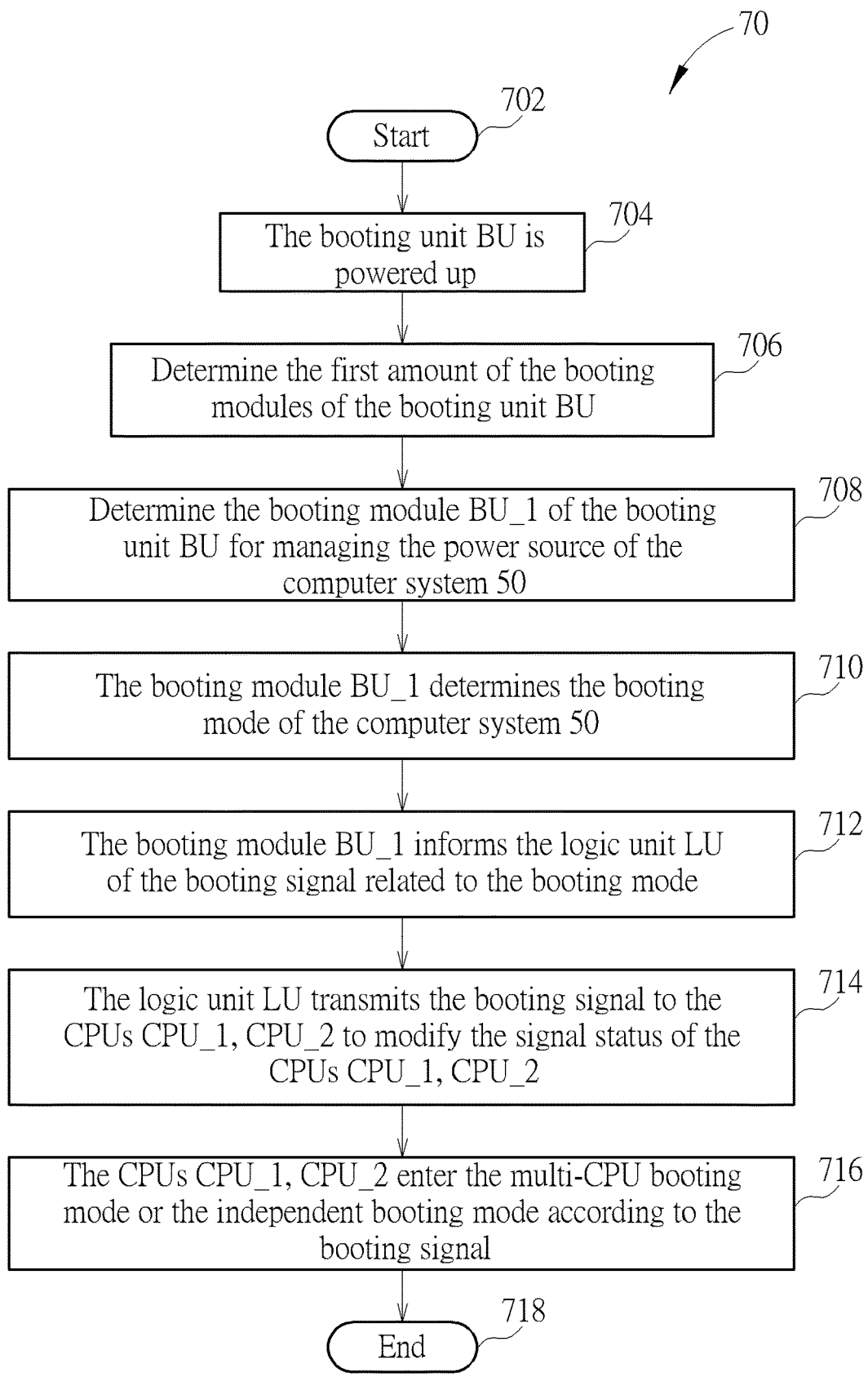

A signal detection method respectively of the computer systems 40, 50 according to an embodiment of the present invention is summarized by system booting methods 60, 70, as shown in FIGS. 6 and 7. The system booting method 60 corresponds to the embodiment of the computer system 40 in FIG. 4, which includes the following steps:

Step 602: Start;
Step 604: The booting unit BU is powered up;
Step 606: The booting unit BU determines the booting mode of the computer system 40;
Step 608: The booting unit BU informs the logic unit LU of the booting signal related to the booting mode;
Step 610: The logic unit LU transmits the booting signal to the CPUs CPU_1, CPU_2 to change the signal status of the CPUs CPU_1, CPU_2;
Step 612: The CPUs CPU_1, CPU_2 enter the multi-CPU booting mode or the independent booting mode according to the booting signal;
Step 614: End.

The system booting method 70 corresponds to the embodiment of the computer system 50 in FIG. 5, which includes the following steps:

Step 702: Start.
Step 704: The booting unit BU is powered up;
Step 706: Determine the first amount of the booting modules of the booting unit BU;
Step 708: Determine the booting module BU_1 of the booting unit BU for managing the power source of the computer system 50;
Step 710: The booting module BU_1 determines the booting mode of the computer system 50;
Step 712: The booting module BU_1 informs the logic unit LU of the booting signal related to the booting mode;
Step 714: The logic unit LU transmits the booting signal to the CPUs CPU_1, CPU_2 to modify the signal status of the CPUs CPU_1, CPU_2;
Step 716: The CPUs CPU_1, CPU_2 enter the multi-CPU booting mode or the independent booting mode according to the booting signal;
Step 718: End.

Refer to embodiments of the computer systems 10, 40, 50 mentioned above for a detailed description of the operation process of the system booting methods 60, 70, which will not be repeated herein for brevity.

Notably, those skilled in the art may make proper modifications to the present invention according to different requirements. For example, an amount of the CPU or the booting module, an allocation method of communication interfaces of the computer system, may be adjusted according to settings of computer systems. All these modifications belong to the scope of the present invention.

In summary, the present invention provides a system booting method and a related computer system, which operates the computer system with a multi-CPU booting mode or an independent booting mode to improve a computation ability of the computer system or server to diversify system risks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system booting method for a computer system having a plurality of central processing units (CPU) and a booting unit, the system booting method comprising:
   determining, by the booting unit, a booting mode of the computer system;
   transmitting a booting signal, which is related to the booting mode, to the plurality of CPUs of the computer system; and
   entering a multi-CPU booting mode or entering an independent booting mode of all of the plurality CPUs according to the booting signal;
   wherein a first baseboard management controller (BMC) of the booting unit is configured to manage a system power source of the computer system;
   wherein the multi-CPU booting mode is of the plurality of CPUs entering identical operating system (OS) for processing identical thread or program;
   the independent booting mode is of the plurality of CPUs independently entering different operating systems for processing different threads or programs;
   wherein when the booting unit includes a plurality of BMCs, the first BMC of the booting unit is configured to determine a first amount of the plurality of BMCs via Inter-Integrated Circuit ($I^2C$), and the plurality of BMCs are configured to determine the first amount of the plurality of BMCs via firmware or hardware.

2. The system booting method of claim 1, wherein the booting unit is configured to determine the booting mode according to a hardware status or a firmware status of the computer system.

3. The system booting method of claim 1, wherein the booting unit is configured to transit the booting signal to the plurality of CPUs via a communication interface.

4. The system booting method of claim 1, wherein the first BMC of the booting unit is configured to determine a first central processing unit of the plurality of CPUs as a main central processing unit.

5. The system booting method of claim 1, further comprising:
   when the plurality of CPUs enter the multi-CPU booting mode, the booting unit is configured to determine a first central processing unit of the plurality of CPUs as a main central processing unit; and
   the booting unit is configured to transmit the booting signal to the plurality of CPUs via a logic unit.

6. The system booting method of claim 1, further comprising:
   when the plurality of CPUs enter the independent booting mode, the booting unit is configured to determine each of the plurality of CPUs as a main central processing unit; and
   the booting unit is configured to transmit the booting signal to the plurality of CPUs via a logic unit.

7. A computer system, comprising:
   a plurality of central processing units (CPU); and
   a booting unit, configured to determine a booting mode of the computer system, transmit a booting signal, which is related to the booting mode, to the plurality of CPUs of the computer system; and enter a multi-CPU booting mode or enter an independent booting mode of all of the plurality CPUs according to the booting signal;
   wherein a first baseboard management controller (BMC) of the booting unit is configured to manage a system power source of the computer system;
   wherein the multi-CPU booting mode is of the plurality of CPUs entering identical operating system (OS) for processing identical thread or program; the independent booting mode is of the plurality of CPUs independently entering different operating systems for processing different threads or programs;
   wherein when the booting unit includes a plurality of BMCs, the first BMC of the booting unit is configured to determine a first amount of the plurality of BMCs via Inter-Integrated Circuit ($I^2C$), and the plurality of BMCs are configured to determine the first amount of the plurality of BMCs via firmware or hardware.

8. The computer system of claim 7, wherein the booting unit is configured to determine the booting mode according to a hardware status or a firmware status of the computer system.

9. The computer system of claim 7, wherein the booting unit is configured to transit the booting signal to the plurality of CPUs via a communication interface.

10. The computer system of claim 7, wherein the first BMC of the booting unit is configured to determine a first central processing unit of the plurality of CPUs as a main central processing unit.

11. The computer system of claim 7, wherein when the plurality of CPUs enter the multi-CPU booting mode, the booting unit is configured to determine a first central processing unit of the plurality of CPUs as a main central processing unit; and the booting unit is configured to transmit the booting signal to the plurality of CPUs via a logic unit.

12. The computer system of claim 7, wherein when the plurality of CPUs enter the independent booting mode, the booting unit is configured to determine each of the plurality of CPUs as a main central processing unit; and the booting unit is configured to transmit the booting signal to the plurality of CPUs via a logic unit.

* * * * *